(12) United States Patent
Chang et al.

(10) Patent No.: US 10,594,583 B2
(45) Date of Patent: Mar. 17, 2020

(54) BANDWIDTH ESTIMATION BASED ON BUFFER AND ADAPTIVE BITRATE PUBLISH IN REAL-TIME LIVE ENVIRONMENT

(71) Applicant: NAVER Corporation, Seongnam-si (KR)

(72) Inventors: Joon-kee Chang, Seongnam-si (KR); SungHo Kim, Seongnam-si (KR); Sungtak Cho, Seongnam-si (KR); In Cheol Kang, Seongnam-si (KR); Jihoon Ah, Seongnam-si (KR); Jeong Myeong Kim, Seongnam-si (KR); Young Soo Lee, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 56 days.

(21) Appl. No.: 15/856,902

(22) Filed: Dec. 28, 2017

(65) Prior Publication Data

US 2018/0183696 A1    Jun. 28, 2018

(30) Foreign Application Priority Data

Dec. 28, 2016    (KR) .................. 10-2016-0181134

(51) Int. Cl.
| | | |
|---|---|---|
| *H04L 12/26* | (2006.01) | |
| *H04L 12/825* | (2013.01) | |
| *H04L 12/853* | (2013.01) | |
| *H04L 12/835* | (2013.01) | |
| *H04L 12/841* | (2013.01) | |

(52) U.S. Cl.
CPC ...... *H04L 43/0876* (2013.01); *H04L 47/2416* (2013.01); *H04L 47/25* (2013.01); *H04L 47/28* (2013.01); *H04L 47/30* (2013.01)

(58) Field of Classification Search
None
See application file for complete search history.

(56) References Cited

U.S. PATENT DOCUMENTS

| 8,379,523 B2 | 2/2013 | Gunatilake |
|---|---|---|
| 2003/0067872 A1 | 4/2003 | Harrell et al. |
| | (Continued) | |

FOREIGN PATENT DOCUMENTS

| JP | 2014011636 A | 1/2014 |
|---|---|---|
| JP | 2014112779 A | 6/2014 |
| | (Continued) | |

OTHER PUBLICATIONS

Japanese Office Action issued in corresponding Japanese patent application No. 2017-248043, dated Dec. 18, 2018.

(Continued)

*Primary Examiner* — Kodzovi Acolatse
(74) *Attorney, Agent, or Firm* — Greer Burns & Crain, Ltd.

(57) ABSTRACT

Provided is a method and system for measuring a bandwidth of a network based on a buffer and adaptively transmitting data in a real-time live environment. The method includes verifying a duration of data storage in a buffer configured to manage a data packet in a real-time live environment; and measuring a bandwidth of a network based on the duration of data storage in the buffer and adaptively controlling a data transmission rate based on the bandwidth.

15 Claims, 6 Drawing Sheets

(56) References Cited

U.S. PATENT DOCUMENTS

| | | | | |
|---|---|---|---|---|
| 2006/0126713 A1* | 6/2006 | Chou | ............... | H04L 47/10 375/225 |
| 2006/0165166 A1* | 7/2006 | Chou | ............... | H04N 21/23406 375/240.05 |
| 2012/0246690 A1* | 9/2012 | Einarsson | ............... | H04N 21/23406 725/109 |
| 2013/0308919 A1* | 11/2013 | Shaw | ............... | H04N 21/2221 386/239 |
| 2013/0322242 A1* | 12/2013 | Swenson | ............... | H04L 47/11 370/232 |
| 2014/0156863 A1* | 6/2014 | Gao | ............... | H04L 65/4084 709/231 |
| 2015/0032851 A1* | 1/2015 | Lieber | ............... | H04L 65/602 709/219 |
| 2016/0050246 A1* | 2/2016 | Liao | ............... | H04L 5/0085 709/219 |
| 2017/0257409 A1* | 9/2017 | Binns | ............... | H04L 65/4092 |

FOREIGN PATENT DOCUMENTS

| | | | |
|---|---|---|---|
| KR | 20090022615 | A | 3/2009 |
| KR | 101090440 | B1 | 12/2011 |
| KR | 20120041493 | A | 5/2012 |
| KR | 101182518 | B1 | 9/2012 |
| KR | 101182550 | | 9/2012 |

OTHER PUBLICATIONS

Korean Office Action dated Aug. 1, 2018 by the Korean Patent Office corresponding to Korean patent application No. 10-2016-0181134.

* cited by examiner

BANDWIDTH ESTIMATION BASED ON BUFFER AND ADAPTIVE BITRATE PUBLISH IN REAL-TIME LIVE ENVIRONMENT

CROSS-REFERENCE TO RELATED APPLICATION(S)

This application claims priority under 35 U.S.C. § 119 to Korean Patent Application No. 10-2016-0181134 filed on Dec. 28, 2016, in the Korean Intellectual Property Office (KIPO), the entire contents of which are incorporated herein by reference.

BACKGROUND OF THE INVENTION

Field of the Invention

One or more example embodiments relate to a technique for measuring a bandwidth of a network and adaptively transmitting data based on the measured bandwidth.

Description of Related Art

In general, data is transmitted and received based on a packet unit on the Internet. Here, instead of guaranteeing a transmission bandwidth between two terminals performing communication at all times, data is transmitted and received by dynamically occupying a bandwidth based on each packet unit once a path is selected.

Currently, since mass data, for example, moving pictures, are being popularly used, a service of streaming moving picture data in real time may provide a service that satisfies quality of service (QoS) by transmitting the moving picture data based on a transmission bandwidth of a network.

Here, a technique for measuring a bandwidth of actually transmittable data when transmitting data through a network may be regarded to play an important role. For example, a technique for measuring a bandwidth of a mobile transmission network is disclosed in Korean Patent Registration No. 10-1182550, registered on Sep. 6, 2012.

BRIEF SUMMARY OF THE INVENTION

One or more example embodiments provide an adaptive bitrate publish (ABP) technique for measuring a bandwidth of a network based on a duration of a buffer configured to manage a data packet in a real-time live environment and adaptively changing a data transmission speed based on the measured bandwidth.

According to an aspect of at least one example embodiment, there is provided a method implemented in a computer, the method including verifying the duration of data storage in a buffer configured to manage a data packet in a real-time live environment; and measuring the bandwidth of a network based on the duration of data storage in the buffer and adaptively controlling a data transmission rate based on the bandwidth.

Verifying the duration of data storage may include verifying the duration of data storage in the buffer periodically every first time period.

Controlling the data transmission rate may include decreasing a bitrate in response to the duration of data storage in the buffer being greater than or equal to a second time; and increasing the bitrate in response to the duration of data storage in the buffer being less than the second time.

Decreasing the bitrate may include measuring an available bandwidth of the network in response to the duration of data storage in the buffer being greater than or equal to the second time, and decreasing the bitrate based on the available bandwidth.

Decreasing the bitrate may include dropping at least one of a video packet and an audio packet included in the data packet.

Decreasing the bitrate may include dropping a video packet between the video packet and an audio packet included in the data packet in response to the duration of data storage in the buffer being less than or equal to a third time; and dropping all of the video packet and the audio packet in response to the duration of data storage in the buffer exceeding the third time.

Increasing the bitrate may include increasing the bitrate based on a step unit in response to the duration of data storage in the buffer being less than the second time.

Increasing the bitrate may include increasing the bitrate based on a step unit in response to a state in which the duration of data storage in the buffer is less than the second time being maintained consecutively a set number of times or more.

Increasing the bitrate may include increasing the set number of times in response to the state in which the duration of data storage in the buffer is less than the second time not being maintained during a fourth time after increasing the bitrate; and decreasing the set number of times in response to the state in which the duration of data storage in the buffer is less than the second time being maintained during the fourth time after increasing the bitrate.

Verifying the duration of data storage in the buffer may include verifying the duration of data storage in the buffer once during the first time period and calculating the verified duration as an entire average duration of data storage in the buffer corresponding to the first time period.

Verifying the duration of data storage in the buffer may include verifying the duration of data storage in the buffer a plurality of numbers of times at desired intervals during the first time period and calculating the duration of data storage in the buffer using a weight corresponding to an increase speed or a decrease speed of the duration.

According to an aspect of at least one example embodiment, there is provided a non-transitory computer-readable recording medium storing instructions that, when executed by a processor, cause the processor to perform an adaptive data transmission method including verifying the duration of data storage in a buffer configured to manage a data packet in a real-time live environment; and measuring the bandwidth of a network based on the duration of data storage in the buffer and adaptively controlling a data transmission rate based on the bandwidth.

According to an aspect of at least one example embodiment, there is provided a system configured as a computer, the system including at least one processor configured to execute computer-readable instructions. The at least one processor includes a buffer verifier configured to verify the duration of data storage in a buffer configured to manage a data packet in a real-time live environment; and a transmission speed controller configured to measure the bandwidth of a network based on the duration of data storage in the buffer and to adaptively control a data transmission rate based on the bandwidth.

According to some example embodiments, it is possible to embody an adaptive data transmission technique optimized for a real-time live environment by measuring the bandwidth of a network based on the duration of data storage in a buffer and by adaptively changing a data transmission speed based on the measured bandwidth.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
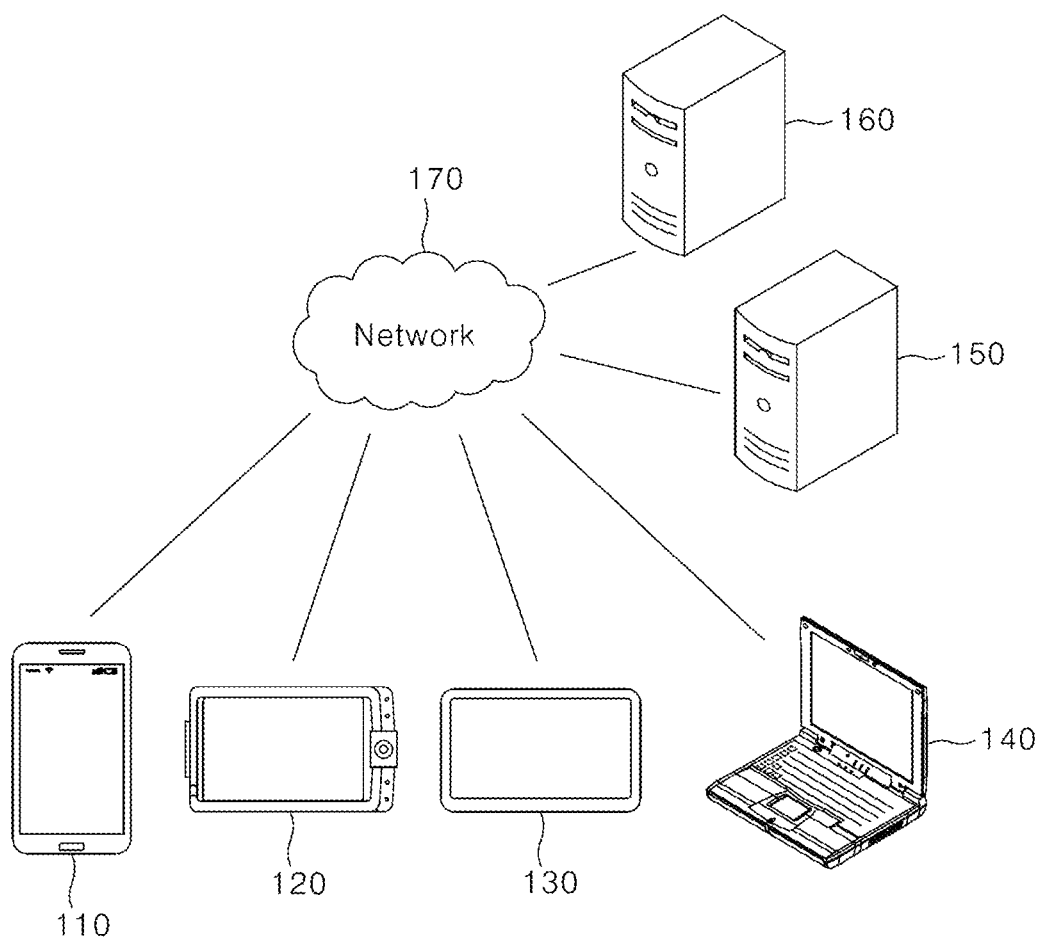
FIG. 1 is a diagram illustrating an example of a network environment according to one embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a technique for measuring a bandwidth of a network and providing a real-time live environment adaptive data transmission for the measured bandwidth.

The example embodiments disclosed herein may implement a buffer-based bandwidth measurement and an adaptive data transmission in a real-time live environment and may achieve many advantages, such as an enhancement in quality of service (QoS) and efficiency, cost reduction, etc.

FIG. 1 is a diagram illustrating an example of a network environment according to one embodiment. Referring to FIG. 1, the network environment includes a plurality of electronic devices 110, 120, 130, 140, a plurality of servers 150, 160, and a network 170. FIG. 1 is provided as an example only and thus, a number of electronic devices and/or a number of servers are not limited thereto.

Each of the plurality of electronic devices 110, 120, 130, 140 may be a fixed terminal or a mobile terminal configured as a computer device. For example, the plurality of electronic devices 110, 120, 130, 140 may be a smartphone, a mobile phone, a navigation, a computer, a laptop computer, a digital broadcasting terminal, a personal digital assistant (PDA), a portable multimedia player (PMP), a tablet personal computer (PC), a gaming console, a wearable device, an Internet of Things (IoT) device, a virtual reality device, an augmented reality device, and the like. For example, the electronic device 110 may communicate with other electronic devices 120, 130, 140, and/or the servers 150, 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150, 160 may be configured as a computer apparatus or a plurality of computer apparatuses that provides instructions, codes, files, contents, services, and the like through communication with the plurality of electronic devices 110, 120, 130, 140 over the network 170.

For example, the server 160 may provide a file for installing an application to the electronic device 110 connected through the network 170. In this case, the electronic device 110 may install the application using the file provided from the server 160. Also, the server 160 may access the server 150 under control of at least one program, for example, browser or the installed application, or an operating system (OS) included in the electronic device 110, and may use a service or content provided from the server 150. For example, when the electronic device 110 transmits a service request message to the server 150 through the network 170 under control of the application, the server 150 may transmit a code corresponding to the service request message to the electronic device 110 and the electronic device 110 may provide content to a user by configuring and displaying a screen according to the code under control of the application.

Figure 2:
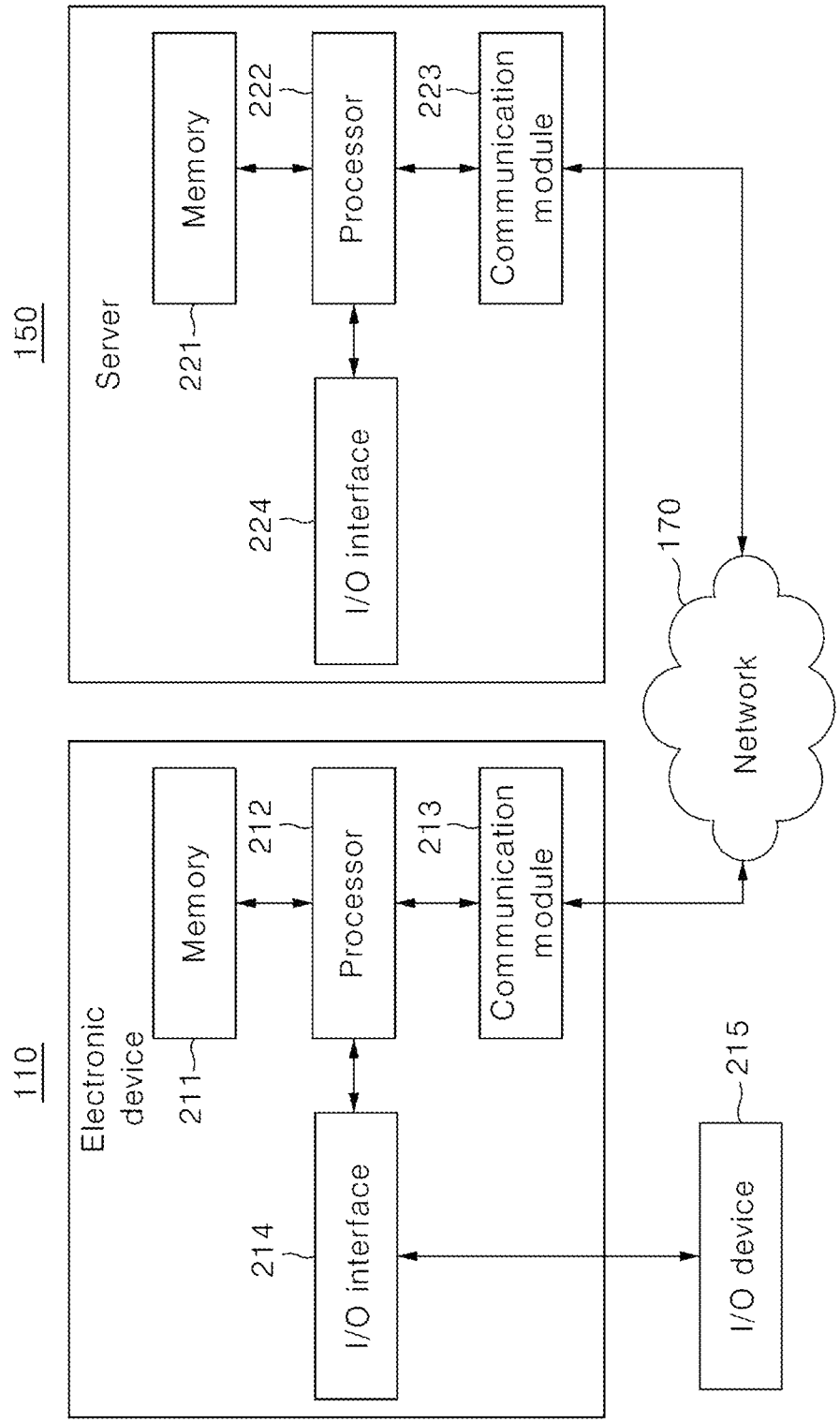
FIG. 2 is a block diagram illustrating an example of a configuration of an electronic device and a server according to one embodiment.

FIG. 2 is a block diagram illustrating an example of a configuration of an electronic device and a server according to one embodiment. FIG. 2 illustrates a configuration of the electronic device 110 as an example for a single electronic device and illustrates a configuration of the server 150 as an example for a single server. The same or similar components may be applicable to other electronic devices 120, 130, 140, or the server 160, and also to still other electronic devices or still other servers.

Referring to FIG. 2, the electronic device 110 includes a memory 211, a processor 212, a communication module 213, and an input/output (I/O) interface 214, and the server 150 includes a memory 221, a processor 222, a communication module 223, and an I/O interface 224. The memory 211, 221 may include a permanent mass storage device, such as random access memory (RAM), read only memory (ROM), a disk drive, a solid state drive, a flash memory, etc., as a non-transitory computer-readable storage medium. Also, an OS or at least one program code, for example, a code for an application installed on the electronic device 110, etc., may be stored in the memory 211, 221. Such software components may be loaded from another non-transitory computer-readable storage medium separate from the memory 211, 221 using a drive mechanism. Other non-transitory computer-readable storage media may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221, for example, an application, installed by files provided over the network 170 from developers or a file distribution system, for example, the server 160, which provides an installation file of the application.

The processors 212, 222 are configured to process computer-readable instructions, for example, the aforementioned at least one program code, of a computer program by performing basic arithmetic operations, logic operations, and I/O operations. The computer-readable instructions may be provided respectively from the memory 211, 221 and/or the communication modules 213, 223 to the processors 212, 222. For example, the processors 212, 222 may be configured to execute received instructions in response to the program code stored in the storage device, such as the memory 211, 222.

The communication modules 213, 223 provide a function for communication between the electronic device 110 and the server 150 over the network 170, and may provide a function for communication between the electronic device 110 or the server 150 and another electronic device, for example, the electronic device 120 or another server, for example, the server 160. For example, the processor 212 of the electronic device 110 may transfer a request, for example, a search request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214 is a device used for interface with an I/O device 215. For example, an input device may include a keyboard, a mouse, a microphone, a camera, etc., and an output device may include a device, such as a display for displaying a communication session of the application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibrator for vibration, etc., which are generally included in the smartphone.

Hereinafter, example embodiments of a method and system for measuring a bandwidth based on a buffer and adaptively transmitting data in a real-time live environment will be described.

In a method of measuring a data transmission speed based on a round trip time (RTT) of the network 170, if a size of data is small or is not consecutive, a relatively great error occurs. Accordingly, the method is unsuitable for a real-time live protocol, for example, a real-time messaging protocol (RTMP).

To configure a data transmission environment optimized for a real-time live environment, proposed herein is an adaptive data transmission technique that measures a network bandwidth based on a duration of storage of data in a data (audio/video) packet buffer managed on a side of the server 150, for example, a live transmission module, and adaptively changes a bitrate and a frame per second (fps) on the fly based on the measured network bandwidth.

That is, the example embodiments provide a function of estimating a network state based on a duration of data storage in a buffer maintained by a publisher, such as an RTMP, and adaptively increasing or decreasing a data transmission speed based on the network state.

Figure 3:
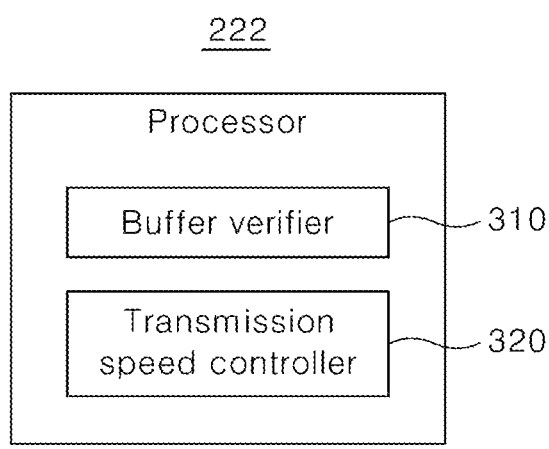
FIG. 3 is a block diagram illustrating an example of components includable in a server according to one embodiment.
Figure 4:
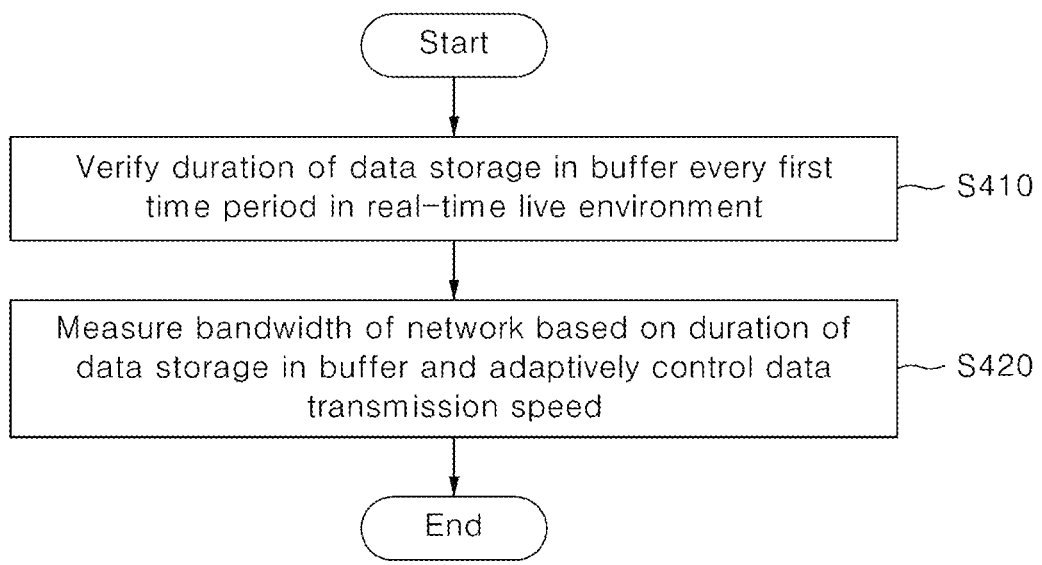
FIG. 4 is a flowchart illustrating an example of a method performed by a server according to one embodiment.

FIG. 3 is a block diagram illustrating an example of components includable in a processor of a server according to one embodiment, and FIG. 4 is a flowchart illustrating an example of a method performed by a server according to one embodiment.

Referring to FIG. 3, the processor 222 of the server 150 includes a buffer verifier 310 and a transmission speed controller 320 as components. The processor 222 and the components of the processor 222 may control the server 150 to perform operations S410 and S420 included in the method of FIG. 4. Here, the processor 222 and the components of the processor 222 may be configured to execute instructions according to a code of at least one program and a code of an OS included in the memory 221. Also, the components of the processor 222 may be representations of different functions performed by the processor 222 in response to a control instruction provided from at least one program or the OS. For example, the buffer verifier 310 may be used as a functional representation that controls the processor 222 to verify the duration of storage of data in a buffer in response to the control instruction.

In operation S410, the buffer verifier 310 verifies the duration of storage of data in a buffer used to temporarily store a data (audio/video) packet in a real-time live environment in which data, such as a moving picture, etc., is transmitted to the electronic device 110 in real time. Here, the buffer verifier 310 verifies the duration of storage of data packets in a queue that is a waiting queue of the buffer configured to manage the data packet periodically every predetermined first time period, for example, every two seconds. For example, the buffer verifier 310 may verify the duration of data storage in the buffer once during A seconds or N times at intervals of 'a' seconds ('a' seconds×N times=A seconds) during the A seconds, based on the A seconds (first time period). In the case of measuring the duration of data storage in the buffer once during the A seconds, the buffer verifier 310 calculates the duration as an entire duration average of the buffer. In the case of measuring the duration of data storage in the buffer N times at intervals of 'a' seconds during the A seconds, the buffer verifier 310 may calculate the duration by assigning a weight every i-th time based on an increase or a decrease in the duration of data storage in the buffer.

In operation S420, the transmission speed controller 320 measures the bandwidth of the network 170 connected to the electronic device 110 based on the duration of data storage in the buffer verified in operation S410, and adaptively controls a data transmission speed based on the bandwidth of the network 170. Accordingly, the transmission speed controller 320 may achieve an adaptive data transmission environment of changing a data transmission speed based on the duration of data storage in the buffer that manages data packets.

An adaptive data transmission process of the transmission speed controller 320 will be further described with reference to FIG. 5.

Basic operation conditions of an adaptive data transmission technique according to the example embodiments follow as:

(1) Bitrate decrease policy: Decreasing a bitrate, for example, decreasing the screen quality of a moving picture, needs to operate sensitively, but positively or actively.

(2) Bitrate increase policy: Increasing a bitrate, for example, increasing the screen quality of the moving picture, needs to operate conservatively or cautiously.

Figure 5:
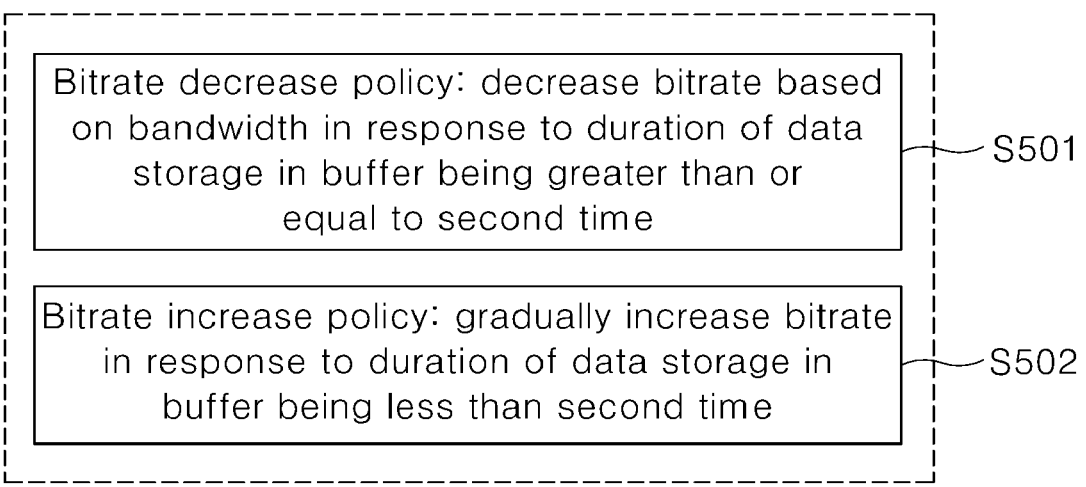
FIG. 5 is a flowchart illustrating an adaptive data transmission process according to at least one exemplary embodiment.

Referring to FIG. 5, in operation S501, the transmission speed controller 320 measures an available bandwidth of the network 170 based on the duration of data storage in the buffer and decreases the bitrate by applying the bitrate decrease policy in response to the duration of data storage in the buffer being greater than or equal to a predetermined second time, for example, 1 second. The second time may be a standard used to determine whether to apply the bitrate decrease policy or the bitrate increase policy.

If the data storage duration exceeds the second time, the transmission speed controller 320 measures a bandwidth and changes the bitrate, for example, calculates a new bitrate according to the bitrate decrease policy. Here, the new bitrate may be defined according to Equation 1.

$$\text{new bitrate} = (1.0 - (B/A)) \times \text{current bitrate} \times \text{weight} \quad \text{[Equation 1]}$$

In Equation 1, A denotes the first time period and B denotes the second time.

The transmission speed controller 320 may further affirmatively or conservatively change the available bandwidth of the network 170 based on a weight factor of Equation 1. For example, the transmission speed controller 320 may affirmatively process the bandwidth by applying a weight greater than 1.0 and may conservatively process the bandwidth by applying a weight less than 1.0. If the new bitrate according to the bitrate decrease policy is less than a preset minimum bitrate, the transmission speed controller 320 may set and change the bitrate using the minimum bitrate.

The transmission speed controller 320 may drop at least one of a video packet and an audio packet to decrease the bitrate.

In the case of dropping the video packet, a level of feeling as if fps is decreased may be perceived at a user end. In contrast thereto, in the case of dropping the audio packet, sound may be disconnected or discontinuous, which may cause the user to feel discomfort in using a service.

Accordingly, in the bitrate decrease policy, an exception may be made such that the audio packet may be preferentially transmitted over the video packet. For example, the transmission speed controller 320 may drop only the video packet in response to the duration of data storage in the buffer being less than or equal to a predetermined third time and may drop all of the video packet and the audio packet in response to the duration of the data storage exceeding the third time. Here, if the duration of data storage in the buffer exceeds the second time and in this situation, a target bitrate is a preset minimum bitrate, the transmission speed controller 320 may drop both of the video packet and the audio packet.

Referring again to FIG. 5, in operation S502, the transmission speed controller 320 gradually increases the bitrate by applying the bitrate increase policy in response the duration of data storage in the buffer being less than the second time. For example, if the second time is 1 second, the transmission speed controller 320 may apply the bitrate decrease policy in response to the duration of data storage in the buffer being greater than or equal to 1 second and may apply the bitrate increase policy in response to the duration of data storage in the buffer being less than 1 second.

The buffer verifier 310 may inspect the duration of data storage in the buffer periodically every first time period. Here, the transmission speed controller 320 may increase the bitrate stage by stage in response to a state in which the duration of data storage in the buffer inspected every first time period is less than the second time being maintained consecutively a set number of times, for example, N number of times or more the duration of data storage is inspected.

In the case of measuring the bandwidth based on the duration of data storage in the buffer, it is impossible to measure a speed greater than or equal to a bitrate that is used for current transmission. Accordingly, the bitrate increase policy may increase the bitrate gradually based on a step unit. Here, when increasing the bitrate, a step size may be a specific constant value or a 1/N value of a default value.

The set number of times described above that is used as a standard to determine whether to increase the bitrate may be changed based on another factor. For example, if the state in which the duration of data storage in the buffer is less than the second time is not maintained during a fourth time, for example, 30 seconds, or more after increasing the bitrate and satisfies the condition for decreasing the bitrate, a factor F corresponding to the set number of times is multiplied by a constant K. For example, if the initial value of the factor F is 5, the maximum value of the factor F is 30, and the constant K is 2, and in this situation, the aforementioned condition is repeated, the set number of times may be changed to be 5->10->20->30. That is, the transmission speed controller 320 may further conservatively increase the bitrate by increasing the bitrate and by increasing the set number of times in response to the state in which the duration of data storage in the buffer is less than the second time not being maintained during the fourth time. Meanwhile, if the bitrate is further increased by satisfying the condition of the bitrate increase policy in a previous state in which the bitrate is increased, the factor F is divided by the constant K. If the initial value of the factor F is 30, the minimum value of the factor F is 5, and the constant K is 2, and in this situation, the aforementioned condition is repeatedly satisfied, the set number of times may be changed to be 30->15->7->5. That is, the transmission speed controller 320 may further aggressively increase the bitrate by increasing the bitrate and by decreasing the set number of times in response to the state in which the duration of data storage in the buffer is less than the second time being maintained during the fourth time.

Prior to applying the bitrate decrease/increase policy, the transmission speed controller 320 may determine that it is possible to restore a buffering state or to enhance the screen quality by changing fps. In this case, the transmission speed controller 320 may preferentially change and process fps over the bitrate. For example, if a measured bandwidth is ½ of a current bitrate during transmission at 30 fps, the transmission speed controller 320 may change the fps from 30 fps to 15 fps.

Figure 6:
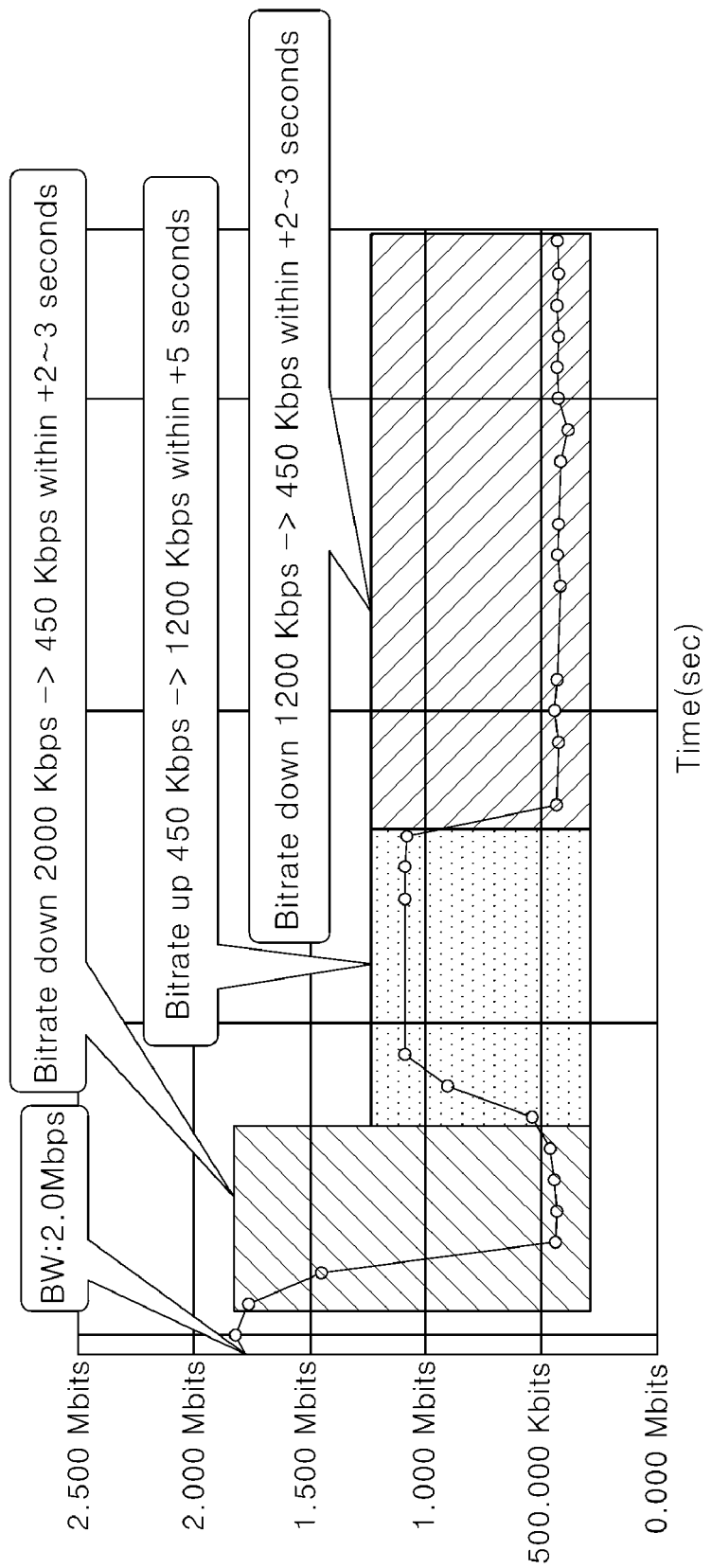
FIG. 6 is a graph showing a bitrate change process based on a bandwidth according to one exemplary embodiment.

FIG. 6 is a graph showing a bitrate change process based on a bandwidth according to at least one example embodiment.

Referring to FIG. 6, in the case of limiting a bandwidth from an initial bandwidth of 2 Mbps to 500 Kbps, a bitrate suddenly decreases within a relatively short period time (e.g., 2-3 seconds) according to a bitrate decrease policy. If the bandwidth is increased from approximately 500 Kbps to approximately 1200 Kbps, the bitrate gradually increases according to a bitrate increase policy. If the bandwidth is decreased from 1200 Kbps to 500 Kbps, the bitrate decreases and is maintained at a constant level. Referring to the graph of FIG. 6, in the bitrate decrease policy, the bitrate may reach a target bitrate within a relatively short period of time based on a sensitive operation condition. In the bitrate increase policy compared to the bitrate decrease policy, the bitrate may reach the target bitrate over a relatively long period of time based on a conservative operation condition.

As described above, according to example embodiments, it is possible to embody an adaptive data transmission technique optimized for a real-time live environment by measuring a bandwidth of a network based on a duration of data storage in a buffer and by adaptively changing a data transmission speed based on the measured bandwidth.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method implemented in a computer for transmitting data to user devices through a network, the method comprising:

verifying a duration of data storage in a buffer in the computer configured to manage a data packet in a real-time live environment; and measuring a bandwidth of the network based on the duration of data storage in the buffer and adaptively controlling a data transmission rate based on the bandwidth, wherein the controlling of the data transmission rate comprises decreasing a bitrate in response to the duration of data storage in the buffer being greater than or equal to a second time, and wherein the decreasing of the bitrate comprises, dropping a video packet between the video packet and an audio packet included in the data packet in response to the duration of data storage in the buffer being less than or equal to a third time; and dropping all of the video packet and the audio packet in response to the duration of data storage in the buffer exceeding the third time.

2. The method of claim 1, wherein the verifying of the duration of data storage comprises verifying the duration of data storage in the buffer periodically every first time period.

3. The method of claim 2, wherein the verifying of the duration of data storage comprises verifying the duration of data storage in the buffer a plurality of numbers of times at desired intervals during the first time period and calculating the duration of data storage in the buffer using a weight corresponding to an increase speed or a decrease speed of the duration.

4. The method of claim 2, wherein the verifying of the duration of data storage comprises verifying the duration of data storage in the buffer once during the first time period and calculating the verified duration as an average duration of data storage in the buffer corresponding to the first time period.

5. The method of claim 1, wherein the controlling of the data transmission rate further comprises:
increasing the bitrate in response to the duration of data storage in the buffer being less than the second time.

6. The method of claim 5, wherein the increasing of the bitrate comprises increasing the bitrate based on a step unit in response to the duration of the buffer being less than the second time.

7. The method of claim 5, wherein the increasing of the bitrate comprises increasing the bitrate based on a step unit in response to a state in which the duration of data storage in the buffer is less than the second time being maintained consecutively a set number of times or more.

8. The method of claim 7, wherein the increasing of the bitrate comprises:
increasing the set number of times in response to the state in which the duration of data storage in the buffer is less than the second time not being maintained during a fourth time after increasing the bitrate; and
decreasing the set number of times in response to the state in which the duration of data storage in the buffer is less than the second time being maintained during the fourth time after increasing the bitrate.

9. A non-transitory computer-readable recording medium storing instructions that, when executed by a processor, cause the processor to perform an adaptive data transmission to user devices through a network, the method comprising:
verifying a duration of data storage in a buffer in the processor configured to manage a data packet in a real-time live environment; and
measuring a bandwidth of a network based on the duration of data storage in the buffer and adaptively controlling a data transmission rate based on the bandwidth,
wherein the controlling of the data transmission rate comprises decreasing a bitrate in response to the duration of data storage in the buffer being greater than or equal to a second time, and
wherein the decreasing of the bitrate comprises,
dropping a video packet between the video packet and an audio packet including in the data packet in response to the duration of data storage in the buffer being less than or equal to a third time; and
dropping all of the video packet and the audio packet in response to the duration of data storage in the buffer exceeding the third time.

10. A system configured as a computer for transmitting data to user devices through a network, the system comprising:
at least one processor configured to execute computer-readable instructions,
wherein the at least one processor comprises:
a buffer verifier configured to verify a duration of data storage in a buffer in the processor configured to manage a data packet in a real-time live environment; and
a transmission speed controller configured to measure a bandwidth of the network based on the duration of data storage in the buffer and to adaptively control a data transmission rate based on the bandwidth,
wherein the controlling of the data transmission rate comprises decreasing a bitrate in response to the duration of data storage in the buffer being greater than or equal to a second time, and
wherein the decreasing of the bitrate comprises,
dropping a video packet between the video packet and an audio packet included in the data packet in response to the duration of data storage in the buffer being less than or equal to a third time; and
dropping all of the video packet and the audio packet in response to the duration of data storage in the buffer exceeding the third time.

11. The system of claim 10, wherein the buffer verifier is configured to verify the duration of data storage in the buffer periodically every first time period.

12. The system of claim 10, wherein the transmission speed controller is further configured to increase the bitrate in response to the duration of data storage in the buffer being less than the second time.

13. The system of claim 12, wherein the transmission speed controller is configured to increase the bitrate based on a step unit in response to the duration of data storage in the buffer being less than the second time.

14. The system of claim 12, wherein the transmission speed controller is configured to increase the bitrate based on a step unit in response to a state in which the duration of data storage in the buffer is less than the second time being maintained consecutively a set number of times or more.

15. The system of claim 14, wherein the transmission speed controller is configured to increase the set number of times in response to the state in which the duration of data storage in the buffer is less than the second time not being maintained during a fourth time after increasing the bitrate, and to decrease the set number of times in response to the state in which the duration of data storage in the buffer is less than the second time being maintained during the fourth time after increasing the bitrate.

* * * * *